| F = 100mm. | | | | f/6.3 |
|---|---|---|---|---|
| ELEMENT | $N_D$ | V | RADII IN mm. | THICKNESS OR SEPARATION IN mm. |
| 1 | 1.611 | 57.2 | $R_1$ = 26.4 | $T_1$ = 4.15 |
| | | | $R_2$ = 585.0 | $S_1$ = 4.30 |
| 2 | 1.579 | 41.0 | $R_3$ = -81.0 | $T_2$ = 1.13 |
| | | | $R_4$ = 27.0 | $S_2$ = 9.25 |
| 3 | 1.611 | 57.2 | $R_5$ = 225.0 | $T_3$ = 2.95 |
| | | | $R_6$ = -54.7 | |

# United States Patent Office 3,418,040
Patented Dec. 24, 1968

3,418,040
WIDE ANGLE TRIPLETS
Muriel D. Ackroyd and William H. Price, Rochester, N.Y., assignors to Eastman Kodak Company, Rochester, N.Y., a corporation of New Jersey
Filed Dec. 27, 1965, Ser. No. 516,459
2 Claims. (Cl. 350—226)

This invention relates to photographic objectives. More specifically, this invention relates to airspaced triplets covering a wide field.

A co-filed patent application, Ser. No. 516,275, filed Dec. 27, 1965 entitled "Triplet Covering a Wide Field" by Rudolf Kingslake provides a new design for airspaced triplets which gives a field coverage of 35° half-angle with vignetting to .30 at that obliquity. These remarkable results in combination are apparently unmatched in the prior art. They were achieved by keeping $R_1$, $R_4$ and $R_6$ (as defined below) within certain fairly broad limits and by placing $R_4$ in an area midway between $R_1$ and $R_6$.

The first design using that invention (designated Example 1 in the co-filed case) needed a very large front element, i.e., an element having a diameter in excess of 30% of the focal length of the objective. The disadvantage of this feature when incorporated into a camera is such that much attention has been spent in designing a lens with the wide angle feature of the co-filed application but with a smaller diameter front element. The result of this work has been the discovery that not only can the front element be reduced in size but that the amount of vignetting can be substantially reduced.

It is an object of this invention to provide an airspaced triplet with a field coverage of 34°, vignetting of .58 at 34° and with a clear aperture diameter of the first element of less than 25% of the focal length of the objective.

This and other objects are accomplished by keeping the powers of $R_1$ and $R_4$ in the lower part of the range encompassed by the co-filed case, by further reducing the overall length of the objective and by moving $R_4$ to a point slightly forward of the mid-point between $R_1$ and $R_6$.

Figures 1, 2:
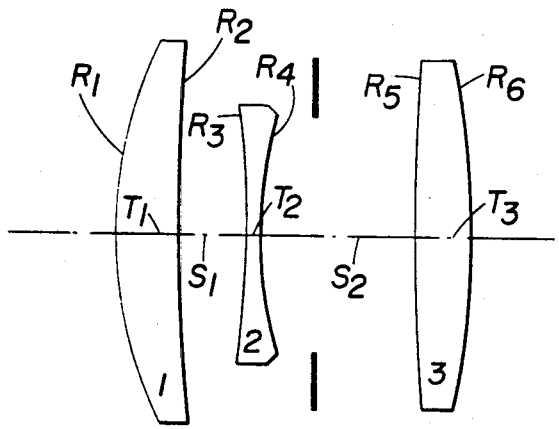
FIG. 1 is a diagrammatic axial cross section of an objective constructed according to the invention.
FIG. 2 is a chart of the specifications for construction of an objective made according to FIG. 1.

In all cases herein, including the drawings, from front to rear, the lens elements are numbered from 1 to 3, the radii of curvature from $R_1$ to $R_6$, the thicknesses from $T_1$ to $T_3$ and the separations from $S_1$ to $S_2$. The indexes of refraction, $N_D$ are for the D line of the spectrum, V represents the respective dispersive index. F is the focal length of the lens. $f_1$ to $f_6$ are the focal lengths in air, $$R/N - 1$$

of the surfaces taken separately. The terms front and rear refer to the long conjugate side and the short conjugate side of the lens respectively.

The invention described above can be more precisely described by the following inequalities:

$$.40 < f_1 < .47$$
$$.42 < f_4 < .50$$
$$.80 < f_6 < 1.05$$
$$f_4 < 0.4 f_3$$
$$L < .25F$$
$$.07F < T_1 + T_2 + S_1 < .11F$$
$$.10F < T_3 + S_2 < .14F$$

$$.52 < \frac{T_3 + S_2}{L} < .58$$

The following examples were designed within these ranges:

EXAMPLE 1
F = 100 mm.    f/6.3

| Element | $N_D$ | V | Radius in mm. | Thickness or Separation in mm. |
|---|---|---|---|---|
| 1 | 1.611 | 57.2 | $R_1 = 26.4$ | $T_1 = 4.15$ |
|   |       |      | $R_2 = 585.0$ |  |
|   |       |      |              | $S_1 = 4.30$ |
| 2 | 1.579 | 41.0 | $R_3 = -81.0$ | $T_2 = 1.13$ |
|   |       |      | $R_4 = 27.0$ |  |
|   |       |      |              | $S_2 = 9.25$ |
| 3 | 1.611 | 57.2 | $R_5 = 225.0$ | $T_3 = 2.95$ |
|   |       |      | $R_6 = -54.7$ |  |

EXAMPLE 2
F = 100 mm.    f/6.3

| Element | $N_D$ | V | Radius in mm. | Thickness or Separation in mm. |
|---|---|---|---|---|
| 1 | 1.611 | 57.2 | $R_1 = 25.5$ | $T_1 = 4.80$ |
|   |       |      | $R_2 = 1,100$ |  |
|   |       |      |              | $S_1 = 3.55$ |
| 2 | 1.605 | 37.9 | $R_3 = -81.4$ | $T_2 = 1.24$ |
|   |       |      | $R_4 = 26.4$ |  |
|   |       |      |              | $S_2 = 8.81$ |
| 3 | 1.611 | 57.2 | $R_5 = 206$ | $T_3 = 3.38$ |
|   |       |      | $R_6 = -55.7$ |  |

The above examples give an airspaced triplet with inexpensive glasses, a field coverage of 34° and vignetting at 34° to .58. For these optimum results the clear aperture diameter of the first element should be approximately 24% of the focal length of the objective, the clear aperture diameter of the front surface of the middle element should be about 16% of the focal length of the objective and the clear aperture diameter of the rear surface of the rear element should be about 23% of the focal length of the objective. Satisfactory results can be obtained if these diameters are kept in excess of 20%, 13% and 20% respectively.

In each of the examples the diaphragm is placed in the second airspace approximately 2.8 mm. from the rear surface of the middle element.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. A wide angle photographic objective consisting of two outer positive elements separated by and airspaced from a central negative element in which the radii of curvature R, the separations S, the thicknesses T, the refractive indexes $N_D$, and the dispersive indexes V, each numbered by subscripts from front to rear, conform substantially to the following specifications:

F=100 mm.    f/6.3

| Element | $N_D$ | V | Radius in mm. | Thickness or Separation in mm. |
|---|---|---|---|---|
| 1 | 1.61 | 57.2 | $R_1=26.4$ | $T_1=4.15$ |
|   |      |      | $R_2=585$  | $S_1=4.30$ |
| 2 | 1.58 | 41.0 | $R_3=-81.0$ | $T_2=1.13$ |
|   |      |      | $R_4=27.0$ | $S_2=9.25$ |
| 3 | 1.61 | 57.2 | $R_5=225$  | $T_3=2.95$ |
|   |      |      | $R_6=-54.7$ |            |

2. A photographic objective according to claim 1 which conforms substantially to the following specifications:

F=100 mm.    f/6.3

| Element | $N_D$ | V | Radius in mm. | Thickness or Separation in mm. |
|---|---|---|---|---|
| 1 | 1.61 | 57.2 | $R_1=25.5$ | $T_1=4.8$ |
|   |      |      | $R_2=1,100$ | $S_1=3.55$ |
| 2 | 1.61 | 37.9 | $R_3=-81.4$ | $T_2=1.24$ |
|   |      |      | $R_4=26.4$ | $S_2=8.81$ |
| 3 | 1.61 | 57.2 | $R_5=206$  | $T_3=3.38$ |
|   |      |      | $R_6=-55.7$ |            |

References Cited

UNITED STATES PATENTS 2,279,372  4/1942  Herzberger.
3,087,384  4/1963  Baur et al.

DAVID SCHONBERG, *Primary Examiner.*

R. J. STERN, *Assistant Examiner.*

U.S. Cl. X.R.

350—209